United States Patent
Coates et al.

(10) Patent No.: US 8,026,317 B2
(45) Date of Patent: Sep. 27, 2011

(54) ISOTACTIC SPECIFIC CATALYST FOR DIRECT PRODUCTION OF HIGHLY ISOTACTIC POLY (PROPYLENE OXIDE) OR HIGHLY ISOTACTIC POLY (BUTYLENE OXIDE)

(75) Inventors: Geoffrey W. Coates, Ithaca, NY (US); Scott D. Allen, Ithaca, NY (US); Claire Cohen, Toledo, OH (US); Kathryn Peretti, Ithaca, NY (US); Hiroharu Ajiro, Minoh (JP)

(73) Assignee: Cornell Research Foundation, Inc., Ithaca, NY (US)

( * ) Notice: Subject to any disclaimer, the term of this patent is extended or adjusted under 35 U.S.C. 154(b) by 500 days.

(21) Appl. No.: 12/155,962

(22) Filed: Jun. 12, 2008

(65) Prior Publication Data

US 2008/0262164 A1    Oct. 23, 2008

Related U.S. Application Data

(62) Division of application No. 11/454,945, filed on Jun. 19, 2006, now Pat. No. 7,399,822.

(60) Provisional application No. 60/692,237, filed on Jun. 21, 2005.

(51) Int. Cl.
*C08L 71/02* (2006.01)
*C08G 65/08* (2006.01)
*C08G 65/10* (2006.01)
*C08G 65/12* (2006.01)

(52) U.S. Cl. .................... 525/409; 528/412; 528/421

(58) Field of Classification Search .................. None
See application file for complete search history.

(56) References Cited

U.S. PATENT DOCUMENTS 2,706,181 A    4/1955  Pruitt et al.
4,962,281 A   10/1990  Laycock

OTHER PUBLICATIONS

Lu, X.-B., et al., "Highly Active, Binary Catalysts Systems for the Alternating Copolymerization of $CO_2$ and Epoxides under Mild Conditions", Angew. Chem. Int. Ed. 2004, vol. 43, pp. 3574-3577.
Wöltinger, J., et al., "Zeolite-Encapsulated Cobalt Salophen Complexes as Efficient Oxygen-Activating Catalysts in Palladium-Catalyzed Aerobic 1,4-Oxidation of 1,3-Dienes", Chem. Eur. J. 1999, vol. 5, No. 5, pp. 1460-1467.
Yoshino, N., et al., "Some Features of Novel Organozinc Complex, . . . Polymerization of Propylene Oxide", Macromol. Chem. 189, 1903-1913 (1998).
Zeng, X., et al., "Ring Opening Polymerization of Propylene Oxide by Chitosan-Supported Rare Earth Catalytic System and its Kinetics", J. Polym. Sci. A: Polym. Chem. 35, 2177-2182 (1977).
Peretti, K.L., et al., "A Highly Active, Isospecifc Cobalt Catalyst for Propylene Oxide Polymerization", J. Am. Chem. Soc. 127, 11566-11567 (2005)—with supporting information.
Wu, Bin, et al., "Stereoregular Polymerization of (R,S)-Propylene Oxide by an Alumoxane-Propylene Oxide Complex", Macromolecules 30, 1997, 316-318.

*Primary Examiner* — David Buttner
(74) *Attorney, Agent, or Firm* — Brenda Herschbach Jarrell; Charles E. Lyon; Danielle M. Nihan

(57) ABSTRACT

(Salph or methoxy salph) Co (initiating ligand) catalyze homopolymerizing rac-PO to produce pure highly isotactic PPO and rac-1-butylene oxide to produce pure isotactic poly (butylene oxide). A product is unfractionated isotactic PPO of m-dyad content >81%, normally at least 99%.

11 Claims, No Drawings

ISOTACTIC SPECIFIC CATALYST FOR DIRECT PRODUCTION OF HIGHLY ISOTACTIC POLY (PROPYLENE OXIDE) OR HIGHLY ISOTACTIC POLY (BUTYLENE OXIDE)

This application is a divisional of U.S. application Ser. No. 11/454,945, filed Jun. 19, 2006 (now U.S. Pat. No. 7,399,822), which claims the benefit of Provisional Patent Application No. 60/692,237, filed Jun. 21, 2005, the whole of which is incorporated herein by reference.

The invention was supported at least in part with U.S. Government Support under National Scientific Foundation Grants No. DMR-0079992 and ECS-9876771.

BACKGROUND OF THE INVENTION

Almost all commercial polypropylenes are highly isotactic rather than atactic since highly isotactic polypropylenes are crystalline and provide structural functionality whereas atactic polypropylenes are amorphous and rubbery. In some cases poly(propylene oxide) is advantageous compared to polypropylene, e.g., in cases where adhering is important (since poly(propylene oxide) adheres better than polypropylene because of the oxygen in the backbone); however, all commercial poly(propylene oxide)s are atactic (and amorphous) and are not suitable for structural functionality and are not resistant to dissolving. On the other hand, isotactic poly(propylene oxide) is crystalline and suitable for structural functionality and is resistant to dissolving.

The reasons why commercial poly(propylene oxide)s are atactic is because of the high expense of optically active propylene oxide and because of the lack of catalysts that can isospecifically polymerize rac-propylene oxide, so that in almost all cases where isotactic poly(propylene oxide)s are synthesized, the product is a mixture of isotactic and atactic poly(propylene oxide)s. The mixture must be fractionated for recovery of isotactic poly(propylene oxide) e.g., by immersing the admixture in acetone below 0° C. which dissolves atactic poly(propylene oxide) but not isotactic poly(propylene oxide) and fractionation takes time and is expensive.

Catalysts have been developed that produce isotactic poly(propylene oxide) as a sole product (see Yoshino, N., et al., Macromol. Chem. 189, 1903-1913 (1988)), but said production requires a period of days and the m-dyad content is below 81%.

A higher dyad content has the advantage of a higher melting point and therefore suitability for higher temperature use.

Moreover, known catalysts that achieve high $M_n$ provide high polydispersity index (PDI) and those that achieve low PDI provide low $M_n$.

As used herein PPO means poly(propylene oxide) and PO means propylene oxide.

SUMMARY OF THE INVENTION

It is an object herein to provide catalysts that directly provide (i.e., without fractionation) highly isotactic PPO from rac-propylene oxide and highly isotactic poly(butylene oxide) from rac-1-butylene oxide and which allow obtaining high $M_n$ with low PDI.

$M_n$, i.e., number average molecular weight, and PDI herein are determined using size exclusion chromatography calibrated by polystyrene standards in 1,2,4-trichlorobenzene at 140° C.

In one embodiment of the invention herein, denoted the first embodiment, there is provided an isotactic specific catalyst useful for rac-propylene oxide polymerization and rac-1-butylene oxide polymerization, namely (salph or methoxy salph) Co (initiating ligand) where salph is N,N'-bis(3,5-di-$C_1$-$C_4$-alkylsalicylidine)-1,2-benzenediamine or N,N'-bis(3-$C_1$-$C_4$-alkyl-5-tert-butylsalicylidine)-1,2-benzenediamine.

In a preferred case, salph is N,N'-bis(3,5-di-tert-butylsalicylidine)-1,2-benzenediamine and the initiating ligand is an acetate (—OCOR) or alkoxide (—OR) where R=$CH_3$.

In another embodiment herein, denoted the second embodiment, the catalyst is made by dissolving (salph) Co or (methoxy salph) Co in methylene chloride, adding H (initiating ligand) and allowing the methylene chloride of the solution to evaporate in air.

In another embodiment herein, denoted the third embodiment, the invention is directed to a method of producing pure highly isotactic (m-dyad content >81%, e.g., >90%, e.g., at least 99%) comprising homopolymerizing rac-PO in the presence of an isospecific, i.e., isotactic specific, catalyst. The m-dyad content is determined herein by $^{13}C$ NMR spectroscopy ($CDCl_3$, 125 MHz). As used herein "m-dyad" means meso-dyad. Generally the method comprises homopolymerizing epoxide, e.g., $C_1$-$C_{10}$ alkylene oxide in the presence of a Schiff base containing metal complex containing cobalt in the 3+ oxidation state.

In still another embodiment herein, denoted the fourth embodiment, the invention is directed at a method for producing isotactic poly(butylene oxide) comprising the step of polymerizing rac-1-butylene oxide in the presence of an isospecific, i.e. isotactic specific, catalyst.

In another embodiment herein, denoted the fifth embodiment, the invention is directed to isotactic PPO having m-dyad content greater than 81%, e.g., greater than 90%, e.g., at least 99%, and containing polymerization catalyst residue.

In still another embodiment herein, denoted the sixth embodiment, the invention is directed to isotactic PPO having m-dyad content greater than 81%, e.g. >90%, e.g., at least 99% and containing no residue indicating fractionation of atactic isotactic PPO admixture, e.g., acetone at 0° C. which was used to dissolve atactic PPO in fractionation of atactic isotactic admixture.

In another embodiment herein, denoted the seventh embodiment, the invention is directed to isotactic PPO having m-dyad content greater than 81%, e.g., >90%, e.g., at least 99%, and $M_n$ greater than 150,000 g/mol.

In another embodiment herein, denoted the eighth embodiment, the invention is directed to isotactic PPO having m-dyad content greater than 81%, e.g., >90%, e.g., at least 99%, and PDI less than 2.0.

In another embodiment herein, denoted the ninth embodiment, the invention is directed to isotactic PPO having m-dyad content greater than 81%, e.g., >90%, e.g., at least 99%, and containing no, i.e., not even a trace of, atactic PPO.

In another embodiment of the invention herein, denoted the tenth embodiment, the invention is directed to a method of modifying the properties of unfractionated isotactic PPO comprising the step of providing admixtures of non-isotactic PPO with the unfractionated isotactic PPO.

The term "initiating ligand" is used herein to mean any ligand that can ring open an epoxide.

DETAILED DESCRIPTION

We turn now to the first embodiment of the invention herein which is directed to an isotactic specific catalyst useful for rac-propylene oxide polymerization and rac-1-butylene oxide polymerization. The catalyst is also useful for preparing copolymer of $C_2$-$C_{10}$ alkylene oxide and $CO_2$ with less than 10% cyclic alkylene carbonate by-product under the conditions described in U.S. Provisional Patent Application No. 60/616,630 or U.S. patent application Ser. No. 11/244,231, the whole of which are incorporated herein by reference.

The catalyst of the first embodiment is (salph or methoxy salph) Co (initiating ligand).

The catalyst is preferably selected from the group consisting of (salph or methoxy salph) Co (initiating ligand) where the initiating ligand is preferably selected from the group consisting of halogen (e.g., Cl, Br, I), $C_1$-$C_{20}$ amido, cyano, azide, $C_1$-$C_{20}$ alkyl carboxylate, including mono-, di- and tricarboxylates and those that are hydroxyl substituted, $C_1$-$C_{20}$ aryl carboxylate including adamantyl carboxylate, $C_1$-$C_{20}$ alkoxide and phenoxide and OH.

Examples of these catalysts are (salph) Co OAc where Ac is acetoyl, (salph) Co BzOAc where BzOAc is benzylacetoyl, (salph) Co NpOAc where NpOAc is naphthylacetoyl, (salph) CoOMe where OMe is methoxy, and (methoxy salph) CoOAc, where OAc is acetoyl where salph is N,N'-bis(3,5-di-tert-butylsalicylidine)-1,2-benzenediamine.

While not being bound by any theory, the origin of isospecificity is considered to arise from aggregates that resist complete dissolution when solvent is added to the crystalline complexes. The achiral cobalt complexes crystallize in a chiral fashion where complexes are related to C2-symmetry axes. Upon addition of solvent and/or epoxide, the complexes partially dissolve, but those that do not have chiral active sites composed of adjacent cobalt centers. These cobalt centers act in concert to isospecifically polymerize chiral epoxides. The complexes exist in a chiral environment due to aggregation or in-situ ligand modification.

We turn now to the second embodiment of the invention which is directed to how isotactic specific catalysts are made; (salph) Co is made as described in Example I hereinafter. Initiating ligand is introduced by dissolving (salph) Co in methylene chloride, adding H (initiating ligand) and allowing the methylene chloride of the solution to evaporate in open air.

The preparation of (salph) CoOAc from (salph) Co is described in detail in Example II hereinafter. To make (salph) CoBzOAc, benzylacetic acid is substituted for the acetic acid in said preparation of Example II. To make (salph) CoNpOAc, naphthylacetic acid is substituted for the acetic acid in said preparation of said Example II. To make (salph) CoOMe, (salph) Co is dissolved in methanol and the methanol of the solution is allowed to evaporate in open air. The preparation of (methoxy salph) CoOAc is described in Example III hereinafter. Methoxy (salph) Co was prepared by adding 3,5-di-tert-butyl-2-hydroxybenzaldehyde to 4-methoxy-1,2-phenylenediamine as described in "Preparation of 3" of Example III to produce product 3 as described in Example III. Said product 3 was converted to (methoxy salph) Co as described in "Preparation of 4" of Example III. To make (methoxy salph) CoOAc, the (methoxy salph) Co is dissolved in methylene chloride, followed by addition of H (initiating ligand), in this case acetic acid, followed by evaporation of the solvent in air as described in Example III.

We turn now to the third embodiment herein directed to a method of producing pure highly isotactic PPO comprising the step of homopolymerizing rac-propylene oxide in the presence of an isospecific, i.e., isotactic specific, catalyst. The isospecific catalysts are those, e.g., of the first and second embodiments herein, i.e., (salph or methoxy salph) Co (initiating ligand). The solvent for reaction is preferably an acyclic ether (e.g., diethyl ether) or an aromatic hydrocarbon (e.g., toluene) or the reaction may be carried out neat. For toluene and diethyl ether, reaction conditions were preferably 0.75 to 5 mol/liter PO/solvent, [PO]/[catalyst]=250:1 to 750:1 and temperature ranging from 0 to 50° C. When the reaction was carried out neat, the [PO]/[catalyst] was preferably 250:1 to 750:1 and the temperature was preferably 0 to 30° C. Reaction times were preferably 0.5 to 6 hours and TOF ranges from 50 to 250 $hr^{-1}$. Molecular weights ($M_n$) obtained ranged from 168,000 g/mol to 423,000 g/mol with PDI ranging from 1.4 to 2.5. Meso-dyad content was >99%. Details of polymerization and results are given in Example IV hereinafter.

We turn now to the method of the fourth embodiment, that is a method for producing isotactic poly(butylene oxide) comprising the step of polymerizing rac-1-butylene oxide (BO) in the presence of an isospecific (isotactic specific) catalyst. Exemplary catalysts are those set forth above. Polymerization conditions are the same as those for rac-PO described above. Polymerization was optimized at 25° C. with [BO]=5M and [BO]/[(salph) CoOAc]=500:1. m-Dyad content was greater than 99%. Under the same conditions, rac-1-hexene oxide (HO) on increasing reaction time to 18 hr at 25° C. and proceeding neat, gave 3% yield. This is described in Example IX hereinafter.

We turn now to the fifth embodiment of the invention herein. A novel product is isotactic PPO having m-dyad content greater than 81%, e.g., greater than 90%, e.g., at least 99%, and containing polymerization catalyst residue. The fact that polymerization catalyst residue is present indicates that the isotactic PPO product was not obtained by fractionation since fractionation, conventionally by dissolving atactic PPO with acetone, also extracts the polymerization catalyst. Polymerization catalyst residue is detectable by imine shifts in the $^1$H NMR spectrum and $^{13}C\{^1H\}$ NMR spectrum.

We turn now to the sixth embodiment herein. Another novel product is isotactic PPO having m-dyad content >81%, e.g., >90%, e.g., at least 99%, containing no residue indicating fractionation of atactic isotactic PPO admixture, e.g., acetone residue or methanol, i.e., indicating the product removal was not obtained by fractionation as described above.

We turn now to the seventh embodiment herein. Another novel product herein is isotactic PPO having m-dyad content greater than 81%, e.g., >90%, e.g., at least 99%, and $M_n$ greater than 150,000 g/mol, e.g., greater than 200,000 g/mol. This is exemplified in Table 1 of Example IV.

We turn now to the eighth embodiment herein. Another novel product herein is isotactic PPO having m-dyad content greater than 81%, e.g., >90%, e.g., at least 99%, and PDI less than 2.0, e.g., less than 1.75, e.g., less than 1.50, especially with $M_n$ greater than 150,000 g/mol or 200,000 g/mol. This is exemplified in Table I of Example IV.

We turn now to the ninth embodiment herein. Another novel product herein is isotactic PPO having m-dyad content greater than 81%, e.g., >90%, e.g., at least 99%, and containing absolutely no atactic PPO since isotactic PPO obtained by fractionation contains at least a trace of atactic PPO. The absence of trace amount or more of atactic PPO is detectable by $^{13}C\{^1H\}$ NMR spectroscopy.

We turn now to the tenth embodiment herein, i.e., to the method of modifying the properties of unfractionated isotactic PPO comprising the step of providing admixture of non-isotactic PPO (e.g., syndiotactic PPO or atactic PPO) with the unfractionated isotactic PPO. This method is carried out to provide from 0.1% to 99.9%, e.g., 5% to 50%, by weight nonisotactic PPO in admixture with from 99.9% to 0.1%, e.g., 95% to 50% isotactic PPO. The method is carried out, for example, to introduce some flexibility. This method is exemplified in Example XI herein.

The term "unfractionated isotactic PPO" is used herein to mean polymer unaltered from its crude state. Unfractionated isotactic PPO is shown by detection of presence of polymerization catalyst residue, no detection of solvent that fractionates isotactic PPO from atactic isotactic admixture and by detection of at least trace amount of atactic PPO.

The invention is illustrated by the following working examples.

EXAMPLE I

Preparation of (salph) Co

N,N'-bis-(3,5-di-tert-butylsalicylidene)-1,2-phenylenediaminocobalt (1). Under nitrogen, degassed ethanol (150 mL) was added to a flask charged with a Teflon-coated stir bar, N,N'-bis-(3,5-di-tert-butylsalicylidene)-1,2-phenylenediamine (3.0 g, 5.5 mmol) and cobalt(II) acetate tetrahydrate (0.98 g, 3.9 mmol). The flask was heated to 80° C. for 20 minutes and then cooled to 22° C. Solvent was removed by vacuum filtration in air and solids were washed with methanol. The dark red powder was recrystallized by dissolving it in methylene chloride (30 mL) and layering with hexanes (700 mL), followed by cooling to 0° C. After 24 h, dark red crystals of 1 were obtained and isolated by vacuum filtration (2.3 g, 98% yield). IR (KBr cm$^{-1}$): 2960, 2873, 1575, 1523, 1465-1359, 1260. Crystallographic data (solid state structure, shown below): triclinic, a=9.2149(3) Å, b=12.9485(5) Å, c=14.3796(6) Å, a=107.645(2)°, β=93.624(2)°, γ=95.851(2)°, V=1618.5(1) Å$^3$, space group P−1; Z=2, formula weight 597.68 g/mol for ($C_{36}H_{46}CoN_2O_2$) and density (calc.)=1.226 mg/m$^3$; R1=0.0326 and Rw2=0.0945 (I>2σ (I)).

EXAMPLE II

Preparation of (salph) Co OAc (N,N'-bis-(3,5-di-tert-butylsalicylidene)-1,2-phenylenediaminocobalt acetate (2). To a 200 mL beaker charged with a Teflon stirbar, 1 (1.00 g, 1.67 mmol) dissolved in methylene chloride (10 mL), and acetic acid (0.100 mL, 1.75 mmol) was added and the solution stirred open to air while solvent was allowed to evaporate, yielding a bright red powder. The powder, 2, was washed with pentane and dried in vacuo for 12 h (1.1 g, 97% yield). IR (KBr cm$^{-1}$): 2967, 2876, 1613, 1580, 1524, 1490-1361, 1252.

To make (salph) CoBzOAc, an equimolar amount of benzylacetic acid is substituted for the acetic acid.

To make (salph) CoNpOAc, an equimolar amount of naphthlacetic acid is substituted for the acetic acid.

To make (salph) CoOMe, an excess amount of methanol is substituted for the acetic acid and dissolution in methanol is substituted for dissolution in methylene chloride.

EXAMPLE III

Preparation of (methoxy salph) Co OAc

Compound 3 is depicted below.

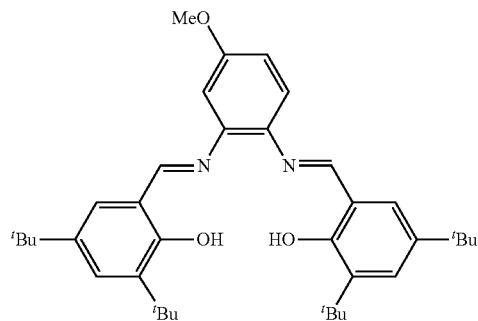

Compound 3 was prepared as set forth below.
Preparation of 3:

In a 100 mL round bottom flask equipped with Teflon stirbar, 3,5-di-tert-butyl-2-hydroxybenzaldehyde (1.47 g, 6.27 mmol) was added to 4-methoxy-1,2-phenylenediamine (0.433 g, 3.14 mmol) dissolved in THF (10 mL). Ethanol (40 mL) was added and the solution stirred at 24° C. A reflux condenser was then attached to the flask and it was heated to 95° C. for 18 h. The reaction was allowed to cool to 24° C. The solution was concentrated to 20 mL, causing solids to precipitate. Solids were filtered and washed with cold ethanol to give a yellow/orange solid (0.424 g, 23.7%).

Compound 3 was converted to (methoxy salph) Co, Compound 4, as follows:
Preparation of 4:

3 (0.400 g, 0.701 mmol) and cobalt acetate tetrahydrate (0.124 g, 0.498 mmol) were combined in a 50 mL round bottom flask. Under $N_2$, degassed ethanol was added and stirred at 24° C. for 2 h. The mixture was filtered under $N_2$ and washed with $H_2O$ (15 mL) followed by MeOH (15 mL). The solids were collected and dried under vacuum for several hours to give a dark red/brown powder (0.289 g, 95.4%).

Compound 4 was converted to (methoxy salph) Co OAc (compound 5) as follows:
Preparation of 5:

4 (0.2 g, 0.4 mmol) was dissolved in dry $CH_2Cl_2$ (30 mL) under $N_2$ and stirred for 5 min. before acetic acid (0.05 mL, 0.9 mmol) was added. The solution stirred for an additional 5 min. before the flask was opened to air. The solution stirred open to air for 18 h while solvent evaporated. The solids were dried under vacuum for 18 h, then washed with pentane and dried under vacuum to give a dark red powder (0.2 g, 80%).

EXAMPLE IV

Polymerization of rac-PO to Produce Isotactic PPO

The following procedures were utilized to polymerize rac-PO using (salph) Co OAc(2).

Representative Procedure for Polymerization of rac-PO. In a drybox, a Schlenk tube was charged with 2 (9.4 mg, 0.014 mmol) and a Teflon stirbar, then sealed and removed from the drybox. Toluene (6.6 mL) was added under $N_2$ and the solution was brought to 0° C. rac-PO (0.50 mL, 7.2 mmol) was added via air-tight syringe, and was stirred for 2 h at 0° C. An aliquot was taken from the reaction mixture for NMR analysis before it was quenched with 1N HCl (5.0 mL). Unreacted PO was removed in vacuo, and methylene chloride (20 mL) was added to dissolve precipitated polymer. The organic layer was separated and solvent was removed by rotary evaporation at 22° C. (370 mg, 89%). At this stage the polymer contains catalyst residue. Polymer was purified by dissolving in hot acetone (5.0 mL) then adding the resulting solution dropwise to acetone (150 mL) at 25° C. The polymer solution was cooled to 0° C. for 3 h. White precipitate was filtered and dried in vacuo to constant weight (360 mg, 86%).

Polymerization of rac-PO at 40° C. A Schlenk tube was prepared in a drybox and solvent was added according to the above representative procedure. rac-PO (0.50 mL, 7.2 mmol) was added via air-tight syringe. The Schlenk tube was sealed and immediately heated to 40° C. The polymerization mixture stirred for 2 h, then was quickly cooled by immersing the Schlenk tube in cold water (100 mg, 32%).

Results and conditions are set forth in Table 1 below.

TABLE 1[a]

Isospecific Polymerization of rac-Propylene Oxide catalyzed by (Salph) Co OAc

| Entry | solvent | [PO] (mol/L) | [PO]/[2] | $T_{rxn}$ (° C.) | yield[b] (%) | TOF[c] ($h^{-1}$) | $M_n$[d] (kg/mol) | $M_w/M_n$[d] | mm-triads[e] (%) | $T_m$[f] (° C.) |
|---|---|---|---|---|---|---|---|---|---|---|
| 1 | THF | 1.0 | 500 | 0 | <1 | ND | ND | ND | ND | ND |
| 2 | $CH_2$—$Cl_2$ | 1.0 | 500 | 0 | <1 | ND | ND | ND | ND | ND |
| 3 | Toluene | 1.0 | 500 | 0 | 23 | 60 | 168 | 1.45 | >99 | 67 |
| 4 | Toluene | 1.0 | 500 | 0 | 89 | 220 | 287 | 1.40 | >99 | 66 |
| 5 | Toluene | 0.5 | 500 | 0 | 1 | 3 | ND | ND | ND | ND |
| 6[g] | Toluene | 1.0 | 1000 | 0 | 6 | 30 | 144 | 4.81 | >99 | 67 |
| 7 | Toluene | 1.0 | 500 | 25 | 40 | 100 | 222 | 2.46 | >99 | 68 |
| 8 | Toluene | 1.0 | 500 | 40 | 32 | 80 | 209 | 2.11 | <99 | 67 |
| 9 | Toluene | 1.0 | 500 | -20 | <1 | ND | ND | ND | ND | ND |

[a]Polymerization run with 0.5 mL of rac-propylene oxide (rac-PO) for 2 hr (applies to all entries but entry 6).
[b]Based on crude polymer weight.
[c]Turnover frequency = mol PO(mol 2 · h).
[d]Determined by size exclusion chromatography calibrated by polystyrene standards in 1,2,4-trichlorobenzene at 140° C.
[e]Determined by $^{13}C\{^1H\}$ NMR spectroscopy (CDCl$_3$, 125 MHz).
[f]Determined by differential scanning calorimetry, run from -90 to 90° C. at 1° C./min.
[g]1.0 mL of rac-PO.

Isospecific polymerization of rac-PO was carried out utilizing (salph) CoOAC (1a in Table 2 below), (salph) CoBzOAc (1b in Table 2 below), (salph) CoNpOAc (1a in Table 2 below), (salph) CoOMe (1d in Table 2 below) and (methoxy salph) CoOAc with results as shown in Table 2 below.

TABLE 2

Isospecific Polymerization of rac-PO Using (salph) Co OAc, (salph) Co Bz OAc, (salph) Co Np OAc, (salph) Co OMe and (methoxy salph) Co OAc

I =

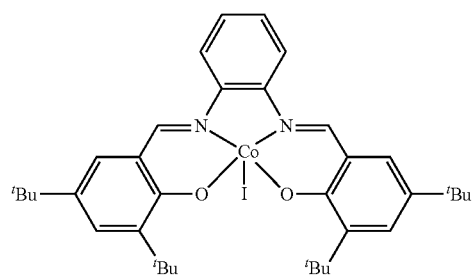

1

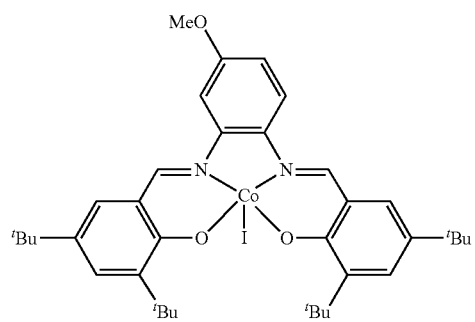

2

TABLE 2-continued

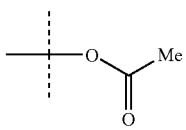

b

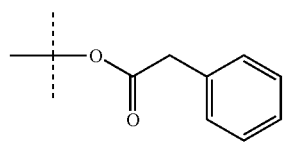

c

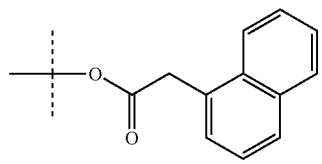

d

—OMe

| Run | Initiator | [PO]/[Co] | Solvent | [PO] mol/L | Temp. (°C.) | Time (h) | Yield[a] (%) | $M_n$ | $M_w/M_n$ | [mm] (%) | $T_m$ (°C) | Exp. N.o. |
|---|---|---|---|---|---|---|---|---|---|---|---|---|
| 1 | 1a | 500 | toluene | 1.0 | 0 | 2 | 86 | 287 | 1.4 | >99 | 64 | HMA2-103 |
| 2 | 1b | 500 | toluene | 5.0 | 0 | 4 | 86 | 423 | 1.4 | >99 | 67 | HMA3-021 |
| 3 | 1c | 1000 | — | neat | 25 | 20 | 6[b] | 294 | 1.4 | 99 | 65 | HMA3-103 |
| 4 | 1d | 500 | — | neat | 25 | 4 | 72 | 371 | 1.5 | 99 | 69 | HMA4-115 |
| 5 | 2a | 500 | — | neat | 25 | 18 | 32 | 492 | 1.6 | >99 | ( ) | KLP2-196 |

[a]Isolated yield from 0 °C acetone.
[b]Determined by crude weight.

In all these experiments, no trace of atactic PPO is detectable by $^{13}C\{^1H\}$ NMR spectroscopy method of analysis in the isotactic PPO product.

EXAMPLE V

Polymerization of rac-PO with Catalyst where Salph Includes di-tert butyl and Initiating Ligand is Varied The Catalyst used has the structural formula

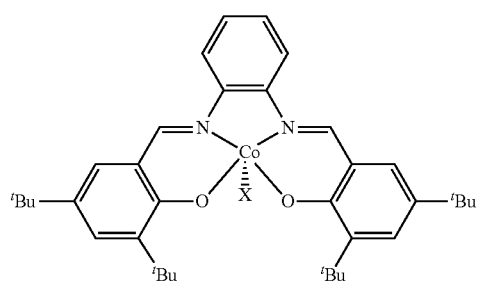

Runs were carried out with reaction conditions and yield results as set forth in Table 3 below. Polymerizations were either neat or run in toluene. In all cases, mm-triad was greater than 99%.

TABLE 3

| Entry | X | Time h | [PO] [Co] | Temp °C. | [PO] M | Yield | |
|---|---|---|---|---|---|---|---|
| klp-5-7 | Br | 18 | 500 | 25 | 7 | 15.5 | |
| klp-2-234 | $OCH_3$ | 18 | 500 | 25 | 14 | 89.2 | |
| klp-2-287 | malonic acid | 20 | 500 | 25 | 2 | 6.7 | |
| klp-2-282 | citric acid | 20 | 500 | 25 | 14 | 3 | |
| klp-2-283 | pimelic acid | 20 | 500 | 25 | 14 | 5 | |
| klp-2-293 | glutaric acid | 20 | 500 | 25 | 14 | 2.5 | |
| klp-3-41 | Ad-COOH | 24 | 500 | 25 | 14 | 37 | (1-adamantyl carboxylic acid) |
| klp-4-147 | Cl | 18 | 500 | 25 | 7 | 18 | |
| klp-5-79 | OH | 18 | 500 | 25 | 14 | 88.2 | |

EXAMPLE VI

Polymerization of rac-PO with Catalyst where Methoxysalph Includes di-tert butyl and Initiating Ligand is Varied The catalyst has the structural formula:

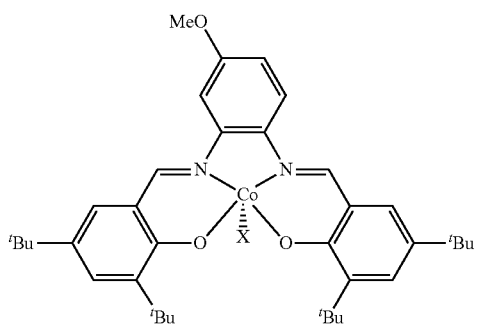

Runs were carried out with reaction conditions and yield results as set forth in Table 4 below. All reactions were run neat and mm-triad were greater than 99%.

TABLE 4

| Entry | X | Time h | PO:Co | Temp (° C.) | [PO] M | yield (%) |
|---|---|---|---|---|---|---|
| klp-2-175 | OAc | 18 | 0.2 | 25 | 14 | 78.8 |
| klp-2-206 | 4-CF$_3$-benzoic acid | 18 | 500 | 25 | 14 | 1 |
| klp-5-81 | OMe | 18 | 500 | 25 | 14 | 17.1 |

EXAMPLE VII

Polymerization of rac-PO with Catalyst where Salph Includes 3-tert-butyl-5-Isopropyl and X is OMe The catalyst has the structural formula:

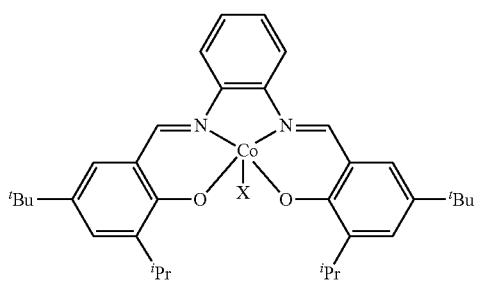

where X is OMe.

Runs were carried out with [PO]:[Co] being 500:1 and [PO] being 7M in toluene with other conditions and results set forth in Table 5 below.

TABLE 5

| Entry | Time H | Temp ° C. | Yield % | [mm] % | [mr] % | [rr] |
|---|---|---|---|---|---|---|
| klp-4-117 | 19 | 25 | 14.8 | 76.3 | 17.0 | 6.7 |
| klp-5-71 | 18 | 25 | 10.5 | 73.4 | 16.5 | 10.1 |

EXAMPLE VIII

Polymerization of rac-PO where Alkyl Substituents On Salicylidine are Varied and X is OAc The catalyst has the Structural Formula:

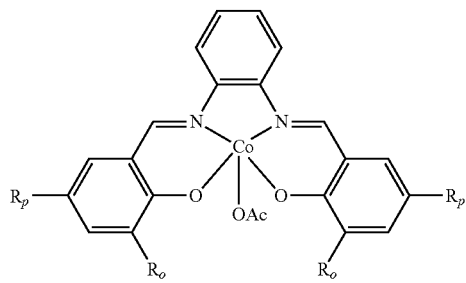

Polymerization conditions and yield results are given in Table 6 below.

TABLE 6

| Entry | Ro | Rp | Solvent | [PO] (M) | PO:Co | Time (h) | Temp (° C.) | Yield (%) | m-dyad (%) |
|---|---|---|---|---|---|---|---|---|---|
| klp-4-72 | iPropyl | tButyl | toluene | 3 | 500 | 17 | 25 | 20.3 | 86 |
| klp-4-31 | Ethyl | tButly | hexanes | 5 | 500 | 24 | 25 | 5.4 | 72 |
| klp-3-281 | Methyl | tButyl | — | 14 | 500 | 24 | 25 | 14.2 | 65 |

EXAMPLE IX

Polymerization of rac-1-Butylene Oxide Using 2 which is (salph) Co OAc

Optimized Polymerization of rac-1-butylene oxide (BO). A vial was charged with 2 (7.5 mg, 0.011 mmol), Teflon stirbar and toluene (0.65 mL) in a drybox. While the mixture was stirring, rac-BO (0.50 mL, 5.8 mmol) was added to the vial. The vial was immediately sealed with a Teflon-lined cap and brought out of the drybox. The reaction was allowed to stir at 25° C. for 4 h then was quenched with 1N HCl. Methylene chloride (20 mL) was added to the solution and the organic layer was separated. Solvent was removed by rotary evaporation at 22° C. To remove remaining cobalt, polymer was dissolved in toluene (40 mL) and stirred with activated alumina before filtering by vacuum filtration. Solvent was removed from the filtrate by rotary evaporation at 22° C., followed by drying in vacuo to give a pale yellow gel (110 mg, 26%). $^1$H NMR (CDCl$_3$, 500 MHz): δ 0.94 (broad, 3H), 1.51-1.58 (broad, 2H), 3.33 (broad, 1H), 3.55 (broad, 2H). $^{13}$C{$^1$H} NMR (CDCl$_3$, 125 MHz): δ 9.92, 25.07, 72.62, 81.11. GPC data: M$_n$=185,000 g/mol, M$_w$/M$_n$=2.08.

EXAMPLE X

Polymerization of 1-Hexene Oxide Using (salph) Co OAc

Polymerization of 1-hexene oxide (HO). In the drybox, 2 (6.6 mg, 0.012 mmol) was added to a vial charged with a Teflon stir bar. While stirring, HO (0.50 mL, 4.1 mmol) was added to the vial. The vial was immediately sealed with a Teflon-lined cap and brought out of the drybox. The reaction stirred at 25° C. for 18 h, then an aliquot of the resultant polymerization mixture was removed from the vial for $^1$H NMR analysis (3.0%).

EXAMPLE XI

Producing Mixture of Unfractionated Isotactic PPO and Non-Isotactic PPO

Preparation of (N,N'-bis-(5-tert-butyl-3-isopropylsalicylidene)-1,2-phenylenediamino)cobalt acetate (6). In a drybox, a schlenk tube was charged with $AlCl_3$ (1.5 g, 11.2 mmol) and Teflon coated stirbar. Under $N_2$, 2-isopropylphenol (15.1 mL, 112 mmol) was added followed by 2-chloro-2-methylpropane (14.5 mL, 134 mmol). The resulting mixture stirred at 25° C. 18 h. Ice water and diethyl ether were added. The ether layer was washed twice with $H_2O$ then once with brine. The organic layer was dried over $MgSO_4$. The crude product was purified by column chromatography (20% EtOAc/hexanes) to give a yellow oil (19 g, 87%). The purified phenol (12 g, 62 mmol) was dissolved in dry toluene and 2,6-lutidine (12 mL, 100 mmol). The solution was cooled to 0° C. and $SnCl_4$ was added slowly. The reaction stirred for 15 min. before paraformaldehyde was added. A drying tube was attached to the schlenk tube, which was then heated to 100° C. for 16 h. The reaction cooled to 25° C. before adding 1N HCl and filtering the resulting suspension over celite. The organic layer was washed with $H_2O$ and dried over $MgSO_4$. Concentration yielded a viscous yellow/brown oil (10 g, 74%). The oil was dissolved in MeOH (75 mL) and 1,2-diaminobenzene (2.4 g, 23 mmol) was added. The solution refluxed for 4 h, then was cooled to 25° C. Yellow solids crashed out and were filtered, washed with MeOH, and dried under vacuum (4.0 g, 34%). The resulting ligand (1.5 g, 2.9 mmol), was dissolved in toluene (15 mL) and cobalt acetate tetrahydrate (0.73 g, 2.9 mmol) was dissolved in MeOH. The toluene solution was added to the MeOH solution and the solution stirred at 25° C. for 1 h. Red solids were filtered, washed with MeOH and dried under vacuum (1.4 g, 83%). The solids were dissolved in $CH_2Cl_2$ and acetic acid (0.10 mL, 2.4 mmol) was added. The solution stirred open to air until all solvent had evaporated. The solids were washed with pentane and dried under vacuum (1.4 g, 93%).

Representative Polymerization of rac-PO with 6:

In a drybox, a vial was charged with 6 (9.0 mg, 0.014 mmol) and a Teflon stirbar. Toluene (0.50 mL) was added and the suspension stirred 3 min. rac-PO (0.50 mL, 7.1 mmol) was then added and the vial was quickly sealed with a Teflon-lined cap. The polymerization stirred at 25° C. for 20 h. The polymerization was quenched with 1N HCl and remaining PO was removed under vacuum. The polymer residue was dissolved in $CH_2Cl_2$ and the HCl was allowed to react overnight. The solution was washed with $H_2O$, dried over $Na_2SO_4$, then concentrated under vacuum (0.063 g, 15%). The resulting polymer had a m-dyad of 84% by $^{13}C\{^1H\}$ NMR spectroscopy, and therefore, acts as a mixture of roughly 20% atactic PPO and 80% isotactic PPO.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. Isotactic PPO having m-dyad content greater than 90% and $M_n$ greater than 150,000.
2. The isotactic PPO of claim 1 where the m-dyad content is at least 99%.
3. The isotactic PPO of claim 1 having $M_n$ greater than 200,000 g/mol.
4. The isotactic PPO of claim 1 having PDI less than 2.0.
5. The isotactic PPO of claim 4 where the PDI is less than 1.75.
6. The isotactic PPO of claim 5 where the PDI is less than 1.50.
7. A method comprising the step of admixing non-isotactic PPO with a PPO of claim 1 or 4.
8. Isotactic PPO having m-dyad content greater than 90% and PDI less than 1.50.
9. The isotactic PPO of claim 8 where the m-dyad content is at least 99%.
10. The isotactic PPO of claim 8 having $M_n$ greater than 200,000 g/mol.
11. A method comprising the step of admixing non-isotactic PPO with a PPO of claim 8.

* * * * *